United States Patent
Obst et al.

(10) Patent No.: US 7,807,739 B2
(45) Date of Patent: Oct. 5, 2010

(54) AQUEOUS EMULSION POLYMER

(75) Inventors: Frederick Peter Obst, North Wales, PA (US); Michelle Anne Toth, Perkasie, PA (US); Timothy Grant Wood, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 293 days.

(21) Appl. No.: 11/651,181

(22) Filed: Jan. 9, 2007

(65) Prior Publication Data

US 2007/0191522 A1 Aug. 16, 2007

Related U.S. Application Data

(60) Provisional application No. 60/773,002, filed on Feb. 14, 2006.

(51) Int. Cl.
*C08K 5/04* (2006.01)
(52) U.S. Cl. .............................. 524/265; 524/261
(58) Field of Classification Search ................. 524/261, 524/265
See application file for complete search history.

(56) References Cited

U.S. PATENT DOCUMENTS

| | | | |
|---|---|---|---|
| 4,861,515 A | 8/1989 | Minamisawa et al. | |
| 4,959,417 A * | 9/1990 | Miyazono et al. | 525/274 |
| 4,990,572 A * | 2/1991 | Miyazono et al. | 525/286 |
| 5,079,313 A * | 1/1992 | Okuno et al. | 525/487 |
| 5,100,955 A | 3/1992 | Pons et al. | |
| 5,319,018 A | 6/1994 | Owens et al. | |
| 5,714,532 A | 2/1998 | Osterholtz et al. | |
| 6,127,462 A | 10/2000 | Chen et al. | |
| 6,174,977 B1 * | 1/2001 | Ariyoshi et al. | 526/194 |
| 6,369,139 B1 | 4/2002 | Osterholtz et al. | |
| 6,730,733 B2 | 5/2004 | Overbeek et al. | |
| 2002/0019457 A1 * | 2/2002 | Sugihara et al. | 523/122 |
| 2002/0115763 A1 * | 8/2002 | Robinson et al. | 524/188 |
| 2003/0134949 A1 | 7/2003 | Brown | |
| 2005/0014879 A1 | 1/2005 | Moroishi et al. | |

FOREIGN PATENT DOCUMENTS

| | | |
|---|---|---|
| EP | 0854153 | 7/1998 |
| WO | 0166659 | 9/2001 |

OTHER PUBLICATIONS

Rhoplex EP-6060. Jun. 1999.*
European Search Report: EP Application No. 07250574, Date of Completion: Sep. 3, 2008.
Chen, Ming J., et al: "Waterborne Epoxy Silane Curing Agents", Modern Paint and Coatings, (Jan. 1998), p. 43-49.
Chen, et al.: "Epoxy Silanes in Reactive Polymer Emulsions", JCT (Dec. 1997), vol. 69, No. 875, p. 49-55.
Harui, et al.: "Novel Ambient Temperature Curable Two-Component Waterborne Silicone-Acrylic Coatings", JCT (May 1998), vol. 70, No. 880, p. 73-77.
Coogan, Richard G.: "Post-crosslinking of water-borne urethanes" (1997) Progress in Organic Coatings, vol. 32, p. 51-63.

* cited by examiner

*Primary Examiner*—Milton I Cano
*Assistant Examiner*—John Uselding
(74) *Attorney, Agent, or Firm*—Cantor Colburn LLP

(57) ABSTRACT

An aqueous composition for coating substrates comprising a blend of a metal-containing crosslinkable polymer, acrylic polymer, and an epoxysilane and method therefore.

16 Claims, No Drawings

AQUEOUS EMULSION POLYMER

This application claims priority to provisional application 60/773,002 filed Feb. 14, 2006.

This invention generally relates to aqueous emulsion polymers. In particular, the present invention relates to an aqueous polymer/epoxysilane blend that provides one-pack stability and desirable resistance properties.

In many coatings applications, especially those that are factory-applied, there is a need for one-component waterborne systems ("1-K") that have performance comparable to that of the solventborne two-pack ("2-K") systems. Traditional 2-K solventborne systems are becoming less desirable as the need to reduce volatile organic chemicals ("VOCs"), and especially hazardous air pollutants, rises.

Particular performance needs include chemical and stain resistance, as well as mar, print and block resistance. Mar, print and block resistance all offer various ways to measure the surface toughness of a film. The mar resistance test focuses on the ability of a film to resist scratches. Print resistance implies that a film will avoid having something of weight imprinted on its surface if the item rests on the film. Lastly, the block resistance test determines if a film is sticky. For example, when two coated surfaces are put in contact with one another, they may become stuck together or come apart easily.

Two-pack waterborne systems may meet some performance needs of coating applications, but have the disadvantage of pot life concerns, or specifically, how long the product would be usable and functional after it is charged with a crosslinking agent. There are waterborne systems that are 1-K, but they typically are unable to meet the performance requirements of 2-K coating applications.

An approach to providing stability is disclosed in U.S. Pat. No. 5,714,532, which describes how adding a silane emulsion to polymer can provide a stable system with improved performance, particularly solvent resistance tested with methyl ethyl ketone rubs, over a polymer without silane. However, it does not teach blends of two different polymers, each offering its own set of performance properties, in addition to the blend with epoxysilane.

An approach to providing the desired resistance properties above is disclosed in U.S. Pat. No. 5,100,955, which combines acid-functional polymers with epoxysilane for a resistant polymer. However, it does not utilize mixed-metal crosslinking and epoxysilane crosslinking to obtain improved mar, chemical stain, block and humidity resistance.

This invention is based on a three-part blend of epoxysilane with two different polymers that enables one-pack stability and a technology that yields high performance and highly resistant coatings. The invention is "1-K stable," meaning that it possesses heat-age and shelf-age stability and will not undergo viscosity increase or phase separation over time. The invention also provides improved overall resistance properties, i.e., chemical, stain, mar, print, and block resistance. The invention differs from other epoxysilane/polymer blends in that it has a dual-crosslinking technology built into the blend. Additionally, not only does the epoxysilane offer crosslinking, but one of the polymers offers mixed-metal crosslinking as well.

One aspect of the invention includes an aqueous composition comprising a metal-containing crosslinkable polymer having at least one ethylenically unsaturated monomer and a metal agent, an acrylic polymer, and an epoxysilane. The metal-containing crosslinkable polymer has a glass transition temperature ("Tg") of 10-40° C., and the acrylic polymer has a Tg of 30-100° C.

Another aspect of the invention includes a method for preparing a coated substrate, comprising providing an aqueous composition with a metal-containing crosslinkable polymer having at least one ethylenically unsaturated monomer and a metal agent, an acrylic polymer, and an epoxysilane; applying the aqueous composition to a substrate; and drying the aqueous composition applied to the substrate to provide the coated substrate. The metal-containing crosslinkable polymer has a Tg of 10-40° C., and the acrylic polymer has a Tg of 30-100° C.

In particular, the invention provides a three-component blend of two aqueous polymers with different compositions and epoxysilane. This three-component blend aqueous composition provides exceptional crosslinking, while being stable in such a way as not to gel or lose performance over a significant period of time. The three components include a metal-containing crosslinkable polymer, an acrylic polymer and an epoxysilane.

The first component is a metal-containing crosslinkable polymer having at least one ethylenically unsaturated monomer and a metal agent. This component has the properties of quick dry and early hardness and mar resistance. Crosslinking monomers with a metal provides a polymer with a rigid structure. One or more metal agents may be added during the polymerization process or added after the polymerization process. Preferably, the mixed-metal crosslinking is achieved through an acrylic emulsion or an acrylic copolymer composition with a post addition of the metal agent. Suitable metal agents include zirconium, zinc, potassium, barium, tin, tungsten, calcium, magnesium, aluminum, iron, cobalt, nickel and copper. Preferred metal agents are zinc and potassium.

Exemplary ethylenically unsaturated monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyethyl(meth)acrylate and hydroxypropyl(meth)acrylate; (meth)acrylamide; (meth)acrylonitrile; styrene and substituted styrenes; butadiene; vinyl acetate, vinyl butyrate and other vinyl esters; and vinyl monomers such as ethylene, vinyl chloride, vinylidene chloride. The use of the term "(meth)" followed by another term such as acrylate or acrylamide, as used throughout the disclosure, refers to both acrylates or acrylamides and methacrylates and methacrylamides, respectively.

Preferred ethylenically unsaturated monomers include butyl acrylate, styrene, methyl methacrylate, and/or methacrylic acid. In a preferred embodiment, the metal-containing crosslinkable polymer comprises 20-50% butyl acrylate, 5-20% methyl methacrylate, 5-50% styrene, and 5-20% methacrylic acid, based on the total weight of the metal-containing crosslinkable polymer. The metal agent may be added in the range of 0.1-10%, based on the weight of the metal-containing crosslinkable polymer with a preferred range of 1-8% and a most preferred range of 1.5-6%, based on the weight of the metal-containing crosslinkable polymer.

The Tg of the metal-containing crosslinkable polymer is in the range of 5-50° C., more preferably, the Tg is 10-40° C. and most preferably, the Tg is 15-30° C. In each instance, the Tg is calculated by using the Fox equation (T. G. Fox, Bull. Am. Physics Soc., Volume 1, Issue No. 3, page 123 (1956)). For copolymers comprising more than two different monomer types, the calculation may be expressed as:

$$1/T_g = \Sigma[w(M_i)/T_{g,}(M_i)],$$

where w(Mi) is the weight fraction of each monomer, and Tg,(Mi) the glass transition temperature of the homopolymer of Mi. For example, for calculating the Tg of a copolymer of monomers M1 and M2, $$1/Tg(\text{calc.}) = w(M1)/Tg(M1) + w(M2)/Tg(M2), \text{ wherein}$$

Tg(calc.) is the glass transition temperature calculated for the copolymer;
w(M1) is the weight fraction of monomer M1 in the copolymer;
w(M2) is the weight fraction of monomer M2 in the copolymer;
Tg(M1) is the glass transition temperature of the homopolymer of M1; and
Tg(M2) is the glass transition temperature of the homopolymer of M2, where all temperatures are in Kelvin (K).

The metal in the metal-containing crosslinkable polymer has not effect on the Tg of that polymer. The Tgs of homopolymers may be found in "Polymer Handbook," $4^{th}$ edition edited by J. Brandrup, E. H. Immergut, and E. A. Grulke, Wiley-Interscience Publishers (1999).

The metal-containing crosslinkable polymer also has a relatively high acid number, with a range of 25-130, a preferred range of 50-120 and a most preferred range of 60-110. The acid number is used to quantify the amount of acid present in a substance. It is the quantity of base, expressed in milligrams of potassium hydroxide, that is required to neutralize the acidic constituents in 1 gram of the substance.

The second component is an acrylic polymer comprising, as polymerized units, at least one ethylenically unsaturated nonionic acrylic monomer. This second component provides ammonia resistance and stability. The ethylenically unsaturated nonionic acrylic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, and hydroxyalkyl (meth)acrylate monomers, such as 2-hydroxyethyl methacrylate, 2-hydroxyethyl acrylate, 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate. Other ethylenically unsaturated nonionic monomers, which may be incorporated into the emulsion polymer, include vinylaromatic compounds, such as styrene, α-methylstyrene, p-methylstyrene, ethylvinylbenzene, vinylnaphthalene, vinylxylenes, and vinyltoluenes; vinyl acetate, vinyl butyrate and other vinyl esters; and vinyl monomers, such as vinyl chloride, vinyl toluene, vinyl benzophenone, and vinylidene chloride.

Ethylenically unsaturated nonionic acrylic monomers also include acrylamides and alkyl-substituted acrylamides, such as acrylamide, methacrylamide, N-tert-butylacrylamide and N-methyl(meth)acrylamide; and hydroxyl-substituted acrylamides, such as methylolacrylamide and beta-hydroxyalkylamides.

Preferred ethylenically unsaturated nonionic acrylic monomers include butyl acrylate, butyl methacrylate, methyl methacrylate, and/or methacrylic acid. In a preferred embodiment, the acrylic polymer comprises 0-15% butyl acrylate, 0-60% butyl methacrylate, 15-60% methyl methacrylate, and 0-15% methacrylic acid, based on the weight of the acrylic polymer.

The Tg of the acrylic polymer is in the range of 30-100° C., with a preferred range of 35-90° C. and a most preferred range of 40-80° C. The acrylic polymer also has a relatively low acid number, with a preferred range of 2-30, a more preferred range of 5-25, and a most preferred range of 10-25. The metal-containing crosslinkable polymer and the acrylic polymer are blended with one another at a ratio of from 0.25:1 to 1:0.25, with a preferred range of from 0.5:1 to 1:0.5. In a preferred embodiment, the Tg's of the metal-containing crosslinkable polymer and the acrylic polymer differ by over 25° C. and their acid numbers differ by over 50 units.

The third component is an epoxysilane. Exemplary epoxysilanes may be found in U.S. Pat. Nos. 5,714,532 and 6,127,462. Epoxysilanes possess dual chemical functionality, wherein the epoxy groups are reactive with carboxyl or amino moieties on the polymer and the alkoxysilyl groups crosslink after hydrolysis by condensing with each other. The addition of the epoxysilane provides additional ammonia resistance. The preferred range for the level of epoxysilane is 0.01-6%, based on total solids weight of the aqueous composition and the most preferred level is 0.05-4%, based on total solids weight of the aqueous composition.

In addition, anionic, cationic or nonionic surfactants may be used to stabilize the aqueous composition by providing colloidal stability. An additional surfactant may be added to the blend for increased stability, in particular, by giving it longer shelf-life or make it more heat-age stable. Suitable surfactants include those listed in McCutcheon's 2002 Volume 1: Emulsifiers and Detergents, North American Edition, The Manufacturing Confectioner Publishing Co. (2002). A preferred surfactant comprises a polyethoxylate surfactant. The surfactant may be added in the range of 0-5% of the total weight of the blend weight of the crosslinking and acrylic polymers, with the preferred range of 0.1-3%. The most preferred practice is to blend the acrylic polymer with the metal-containing crosslinkable polymer, where the acrylic polymer is added to the metal-containing crosslinkable polymer in a mixing vessel. The surfactant is then added to the blend and agitated. Lastly, the epoxysilane is added to the blend. Alternate orders of addition are acceptable as well.

The aqueous composition may also contain other additives, such as pigments, colorants, extenders, emulsifiers, fillers, anti-migration aids, curing agents, hydrophobizing agents, plasticizers, surfactants, salts, buffers, pH adjustment agents such as bases and acids, biocides, mildewcide, wetting agents, defoamers, dispersants, dyes, water miscible organic solvents, anti-freeze agents, anti-oxidants, corrosion inhibitors, adhesion promoters, waxes, accelerators, mar aids, thickeners, flattening agents, and crosslinking agents.

For example, in one embodiment, the aqueous composition comprises:

| Material | Percent by Weight |
| --- | --- |
| Metal-containing crosslinkable polymer, acrylic polymer, epoxysilane | 50-90 |
| Premix (add to above) | |
| Coalescent | 5-20 |
| Plasticizer | 0-6 |
| Water | 0-20 |
| Thickener | 0-10 |
| Mar Aid | 0-5 |
| Wetting agent | 0-3 |
| Defoamer | 0-3 |
| Flatting agent | 0-10 |
| Wax | 0-5 |
| Total weight % | 100% |

In this embodiment, exemplary coalescents include ethylene glycol monobutyl ether, dipropylene glycol monomethyl ether, and propylene glycol monobutyl ether; exemplary plasticizers include Paraplex® WP-1 from Rohm and Haas Company, Philadelphia, Pa. and KP-140 from FMC Corporation, Philadelphia, Pa.; exemplary thickeners include associative thickeners, such as hydrophobically modified alkali soluble emulsions (Acrysol® RM-5, Acrysol® TT-615 from Rohm and Haas Company) and hydrophobically modified urethane thickeners (Acrysol RM-8W, Acrysol® RM-12W, Acrysol® RM-2020 from Rohm and Haas Company); exemplary mar aids include Michem® Emulsion 39235 from Michelman, Inc., Cincinnati, Ohio, and Tego® Glide 410 from Degussa Corporation, Parsippany, N.J.; exemplary wetting agents include Surfynol® 104DPM and Surfynol® 104E from Air Products, Allentown, Pa.; exemplary defoamers include Tego® Foamex 805 and BYK 028 from Degussa Corporation; exemplary flattening agents include Bermasilk MK from Bergen Materials Corp., Elfers, Fla. and Syloid® 7000 from Grace Davison, Columbia, Md.; and exemplary waxes include Michem® Emulsion 39235 from Michelman, Inc., UltraLube® D-865 from Drew Industrial, Boonton, N.J., and Michem®Shield 251 from Michelman, Inc. However, these examples are only exemplary and any other additives may be added to the aqueous composition.

The aqueous composition may be used to prepare a coated substrate by applying the aqueous composition to a substrate and drying the aqueous composition applied to the substrate. A coating with this aqueous composition yields very high appearance and resistance performance, including chemical resistance against items such as 10% ammonia, while maintaining a stable environment without the issues of pot-life.

The aqueous composition is suitable on various substrates and for many applications, including joinery primers and topcoats, metal coatings, plastic coatings, masonry coatings, floor polishes, paper coatings, composite coatings and wood coatings. Preferably, the blend is used for interior wood applications and more preferably, wooden or composite kitchen cabinet topcoats.

Various techniques may be employed to apply the aqueous composition onto a substrate including, for example, brushing, rolling, drawdown, dipping, with a knife or trowel, curtain coating, and spraying methods, such as, for example, air-atomized spray, air-assisted spray, airless spray, high volume low pressure spray, and air-assisted airless spray. The aqueous composition is applied onto a substrate as a single coat or multiple coats. After application, the applied aqueous composition is typically allowed to dry at ambient conditions or alternatively dried by the application of heat to provide a dry coating.

The following examples are presented to illustrate the invention. In the examples, the following abbreviations have been used:
BA is Butyl Acrylate;
MMA is Methyl Methacrylate;
MAA is Methacrylic Acid;
STY is styrene; and
oz is ounce(s);
mls is milliliters.

Test Methods

Heat-aged stability test: The heat-aged stability was tested by filling a 4 oz glass container with the formulated material and placing it in the oven at 120° F. (49° C.) for 14 days. Any gelling of the sample was noted and the performance of the formulations before and after heat-ageing was compared for each sample.

Mar Resistance: Mar resistance was determined by running the ends of a fingernail or a tongue depressor over the finish in a back and forth motion. The amount of scratching or indentations on the coating determined the level of marring. No visible scratches would imply excellent mar resistance (rated 10); whereas many deep scratches or destruction of the film would imply very poor mar resistance (rated 1). Testing was done on unstained maple panels that were coated with two coats of formulated topcoat. The panels were allowed to air dry for 30 minutes between coats. After the second coat was applied, the panels were allowed to cure in ambient temperatures for 14 days.

Print Resistance: 5 wet mls were drawn down on black glass and allowed to air dry overnight (16 hours) to form a film. A two-inch square (41.6 cm$^2$) of cheesecloth was placed on the film and then a 1 square-inch (6.45 cm$^2$) circular leather disk was placed on top of the cheesecloth. A one-pound (0.45 kg) weight was placed on the leather disk. The weight remained on the film for sixteen hours and was then removed. The panel was then inspected for any indentations in the film from the cheesecloth. The test was repeated with a two-pound (0.9 kg) weight.

Humidity Resistance: Maple panels were coated with the two coats of the experimental coatings and allowed to air dry for 14 days. The panels were then placed in a humidity chamber for 4 days. After being subjected to the conditions in the humidity chamber (100° F.(38° C.)/100% relative humidity), the panels were removed and mar resistance was tested. General appearance (blistering, cracking, flaking, etc.) was also noted after humidity testing.

Edgesoak (KCMA) Resistance: (reference the ANS/KCMA Standard A161.1-2000) For the Edgesoak Resistance test, two coats of the experimental coatings were applied to an unstained, solid oak panel, air drying the first coat for one hour before sanding and applying the second coat. The panels were completely coated, including the back and all edges, and then aged for ten days before testing. A ½% solution (by weight) of Palmolive® liquid dish soap in water was prepared. #8 cellulose sponges were placed in a level tank and the tank was filled with the soap water to one-half inch (1.27 cm) below the top level of the sponges. The end grain section of each panel was placed onto the sponges for 24 hours. After the 24 hours, the panels were removed and rated for discoloration, checking, blistering, whitening or other film failure. The test was also repeated on the side grain of the panels.

Chemical and stain tests: These tests were conducted on maple panels that were sealed with a waterborne acrylic sealer and then topcoated with either Example 2 or one of the Comparative topcoats. Four to five wet mls of the sealer was spray-applied, allowed to air dry for 20 minutes and then sanded using a 240 grit stearated sandpaper. Then, the topcoat was spray-applied, also to four to five wet mls. The panels cured at room temperature for ten days. After the ten days, both one hour and 16 hour chemical and stain spot tests were done. A small absorbent disk was laid on the panel and one of several chemicals or stains was used to saturate the disk. Chemical and stains tested included: 50% ethanol, isopropanol, butyl acetate, acetone, water, hot coffee, Formula 409® cleaner, 7% ammonia and red ink. A watch glass then covered the saturated disk for either one or sixteen hours. After the allotted time, the watch glasses were removed, as well as the disk, if it did not adhere to the panel surface. The panels were wiped with a wet cloth and then dried. Any discoloration or damage to the surface as a result of the chemical or stain was noted.

Spot test for 10% ammonia: Both a 2 and 3 minute spot test for 10% ammonia on each of the panels, prepared in the same manner as the other spot tests, except for the duration of the test, were conducted. In all cases, spots were evaluated on a 1-10 scale (10=no change of the surface, 1=complete film deterioration).

Appearance: For gloss and clarity, 5 ml wet drawdowns were made with the experimental coatings on black glass. The samples were allowed to air dry for 16 hours at room temperature. The samples were visually compared for clarity vs. haziness and the gloss of the film was noted. For warmth, the coatings were applied to oak and maple panels and allowed to air dry for 16 hours. The color of the panel was noted. If the coating brought out the red/orange color of the wood, the sample rated high for warmth. If the panel looked washed out or gray in color, the sample rated low for warmth. To determine yellowing, clear coatings were sprayed out on previously coated, white panels. The panels were allowed to air dry for 16 hours and then they were evaluated visually both in daylight and under black light for potential yellowing. The potential yellowing of films is directly related to a white-purplish glow when exposed to black light.

EXAMPLES

Example 1

Preparation of Aqueous Composition of the Invention

At room temperature, 2500 g of Polymer A was added 10 g of deionized water. Polymer A was Rhoplex® EP-6060. To this blend, 1100 g of Polymer B and another 10 g of deionized water were added. Polymer B was Rhoplex® CL-106. To that mixture, 20 g of a nonionic, octylphenol ethoxylate surfactant and an additional 15 g of deionized water was added. Once the blend was complete and thoroughly mixed, 14.22 g of Glycidoxypropylmethyldiethoxysilane was added and mixed thoroughly. The aqueous polymer blend of Example 1 contained 39% weight solids and a pH of 8.5.

Comparative A

Preparation of Comparative Aqueous Emulsion Polymer

The aqueous composition of Comparative A was prepared according to the process of Example 1 except that neither Polymer B nor the surfactant was added. The aqueous composition of Comparative A contained 38% weight solids and had a pH of 8.4.

Comparative B

Preparation of Comparative Aqueous Emulsion Polymer

The aqueous composition of Comparative B was prepared according to the process of Example 1 except that the Glycidoxypropylmethyldiethoxysilane was not added. The aqueous composition of Comparative B contained 39% weight solids and had a pH of 8.5.

Example 2

Aqueous Coating Using Example 1

A semi-gloss topcoat was prepared

TABLE 1

| Semi-Gloss Topcoat | |
| --- | --- |
| Material | Percent by Weight |
| Example 1 Premix (add to above) | 77.8 |

TABLE 1-continued

| Semi-Gloss Topcoat | |
| --- | --- |
| Material | Percent by Weight |
| Coalescent | 9.0 |
| Plasticizer | 1.7 |
| Water | 6.7 |
| Thickener | 0.5 |
| Mar Aid | 1.0 |
| Wetting agent | 0.8 |
| Defoamer | 0.5 |
| Flatting agent | 1.0 |
| Wax | 1.0 |
| Total weight % | 100% |

Coalescent: ethylene glycol monobutyl ether and dipropylene glycol monobutyl ether,
Plasticizer:
Paraplex WP-1
Thickener: Acrysol RM-825
Mar Aid: Tego 410
Wetting agent: Surfynol 104 DPM and BYK 346
Defoamer: BYK 028
Flattening agent: Bermasilk MK
Wax: Michem Emulsion 39235.

The aqueous coating had a solids level of 33.9 weight % and a pH of 8.6.

TABLE 2

| Sample | Formulation | Aqueous Emulsion Polymer |
| --- | --- | --- |
| Example 2 | SG topcoat in Table 1 | Example 1 |
| Comparative C | SG topcoat in Table 1 | Comparative A |
| Comparative D | SG topcoat in Table 1 | Comparative B |

TABLE 3

| Performance Evaluation of SG Topcoats | | | |
| --- | --- | --- | --- |
| Property | Example 2 | Comparative C | Comparative D |
| Heat-aged stability | Stable | Failed | Stable |
| Resistance | | | |
| Mar | 8 | 8 | 8 |
| Print | 5 | 5 | 5 |
| Humidity | 9 | 8 | 7 |
| Edgesoak (KCMA) | 10 | 10 | 10 |
| Chemical and Stain Resistance | | | |
| 10% ammonia resistance | 8 | 7 | 4 |
| 1 hour chemical (average) | 8 | 8 | 7 |
| 16 hour chemical (average) | 6 | 6 | 5 |
| Appearance | | | |
| Gloss | 7 | 7 | 7 |
| Clarity | 8 | 9 | 8 |
| Warmth | 6 | 6 | 6 |
| Yellowing | 9 | 9 | 9 |

Chemical and stain tests included: for 1 hour: 50% ethanol, isopropanol, butyl acetate, and acetone; and for 16 hour: water, hot coffee, 50% ethanol, Formula 409® cleaner, isopropanol, 7% ammonia, and red ink.

With Example 2 and Comparative D, in the heat-aged stability test, no gel was formed upon heat-aging and there was no performance loss. For Comparative C, no gel was formed but there was a significant decrease in performance after heat-aging. Therefore, Example 2 and Comparative D were labeled as stable; whereas Comparative C failed the stability test.

In spot tests, Example 2 and Comparatives C and D performed similarly, except Example 2 showed an advantage in 10% ammonia resistance, as compared to the other two topcoats.

What is claimed is:

1. An aqueous composition comprising:
   a metal-containing crosslinkable polymer derived from at least one ethylenically unsaturated monomer and 1 to 8 wt. % of a metal agent based on the weight of the metal-containing crosslinking polymer, the metal-containing crosslinkable polymer having a Tg of 10-40° C. and an acid number of 25-130;
   an acrylic polymer formed separately from the metal-containing crosslinking polymer, the acrylic polymer having a Tg of 30-100° C. and an acid number of 2-30;
   0.1 to 8 wt. % of an epoxysilane based on the total solids weight of the aqueous composition; and
   0.1 to 3 wt. % of an added nonionic surfactant based on the total solids weight of the aqueous composition, in addition to any surfactant used in the preparation of the metal-containing crosslinkable polymer and the acrylic polymer.

2. The composition of claim 1 wherein the metal agent comprises at least one of zirconium, zinc, potassium, barium, tin, tungsten, calcium, magnesium, aluminum, iron, cobalt, nickel and copper.

3. The composition of claim 1 wherein the metal-containing crosslinkable polymer and acrylic polymer comprise a ratio of 0.25:1 to 1:0.25.

4. The composition of claim 1 wherein the metal-containing crosslinkable polymer comprises at least one of butyl acrylate, styrene, methyl methacrylate, and methacrylic acid and the acrylic polymer comprises at least one of butyl acrylate, butyl methacrylate, methyl methacrylate, and methacrylic acid.

5. A coated substrate comprising the composition of claim 1.

6. The composition of claim 1 wherein the epoxysilane is glycidyloxypropylmethyldiethoxysilane.

7. The composition of claim 1 wherein the metal agent is present in the composition in an amount from 1.5 to 6 wt. % based on the solids weight of the metal-containing crosslinkable polymer; the metal-containing crosslinkable polymer has a Tg of 15-30° C. and an acid number of 50-120; the acrylic polymer has a Tg of 35-90° C. and an acid number of 5-25; and the epoxy silane is present in the composition in an amount from 0.05 to 4 wt. % based on the total solids weight of the aqueous composition.

8. The composition of claim 1 wherein the metal agent is present in the composition in an amount from 1.5 to 6 wt. %, based on the solids weight of the metal-containing crosslinkable polymer; the metal-containing crosslinkable polymer has a Tg of 15-30° C. and an acid number of 60-110; the acrylic polymer has a Tg of 40-80° C. and an acid number of 10-25; and the epoxy silane is present in the composition in an amount from 0.05 to 4 wt. %, based on the total solids weight of the aqueous composition.

9. A method for preparing a coated substrate, comprising the steps of:
   providing an aqueous composition comprising:
      a metal-containing crosslinkable polymer derived from at least one ethylenically unsaturated monomer and 1 to 8 wt. % of a metal agent based on the weight of the metal-containing crosslinking polymer, the metal-containing crosslinkable polymer having a Tg of 10-40° C. and an acid number of 25-130;
      an acrylic polymer formed separately from the metal-containing crosslinkable polymer, the acrylic polymer having a Tg of 30-100° C. and an acid number of 2-30;
      0.1 to 8 wt. % of an epoxysilane based on the total solids weight of the aqueous composition; and
      0.1 to 3 wt. % of an added nonionic surfactant based on the total solids weight of the aqueous composition, in addition to any surfactant used in the preparation of the metal-containing crosslinkable polymer and the acrylic polymer;
   applying the aqueous composition to a substrate; and
   drying the aqueous composition applied to the substrate to provide the coated substrate.

10. The method of claim 9 wherein the providing comprises
   mixing the acrylic polymer with the metal-containing crosslinkable polymer in a mixing vessel to form a mixture;
   adding the at least one added nonionic surfactant to the mixture;
   agitating the mixture; and
   blending the epoxysilane with the mixture.

11. An aqueous composition comprising:
   a metal-containing crosslinkable polymer derived from at least one ethylenically unsaturated monomer and 1 to 8 wt. % of a metal agent based on the weight of the metal-containing crosslinking polymer, the metal-containing crosslinkable polymer having a Tg of 10-40° C., wherein the metal is at least one of zirconium, zinc, potassium, barium, tin, tungsten, calcium, magnesium, aluminum, iron, cobalt, nickel and copper, wherein the metal-containing crosslinkable polymer comprises a repeat unit derived from at least one of butyl acrylate, styrene, methyl methacrylate, and methacrylic acid, and wherein the metal-containing crosslinkable polymer has an acid number of 60-130;
   an acrylic polymer having a Tg of 30-100° C., wherein the acrylic polymer comprises a repeat unit derived from at least one of butyl acrylate, butyl methacrylate, methyl methacrylate, and methacrylic acid, wherein the acrylic polymer comprises an acid number of 2-30, wherein the metal-containing crosslinkable polymer and acrylic polymer comprise a ratio of 0.25:1 to 1:0.25, wherein the Tg of the metal-containing crosslinkable polymer and the Tg of the acrylic polymer differ by over 25° C., and wherein the acid number of the metal-containing crosslinkable polymer and the acrylic polymer differ by over 50 units;
   0.1 to 8 wt. % of an epoxysilane based on the total solids weight of the aqueous composition; and
   0.1 to 3 wt. % of an added surfactant based on the total solids weight of the aqueous composition, in addition to any surfactant used in the preparation of the metal-containing crosslinkable polymer and the acrylic polymer.

12. The composition of claim 11 wherein the metal-containing crosslinkable polymer comprises 20-50% butyl acrylate, 5-20% methyl methacrylate, 5-50% styrene, and 5-25% methacrylic acid, based on the total weight of the metal-containing crosslinkable polymer.

13. The composition of claim 11 wherein the acrylic polymer comprises 15-60% methyl methacrylate.

14. The composition of claim 11 wherein the metal comprises zinc or potassium.

15. The composition of claim 11 wherein the composition provides greater ammonia resistance compared to the same composition without the acrylic polymer and the at least one added surfactant and to the same composition without the epoxysilane.

16. The composition of claim 11 wherein the composition does not show any gelling in a heat-aged stability test at 40° C. for 14 days.

* * * * *